US012639822B2

(12) United States Patent
Nam et al.

(10) Patent No.: US 12,639,822 B2
(45) Date of Patent: *May 26, 2026

(54) DEEP LEARNING BASED IMAGE SEGMENTATION METHOD INCLUDING BIODEGRADABLE STENT IN INTRAVASCULAR OPTICAL TOMOGRAPHY IMAGE

(71) Applicant: DOTTER INC., Incheon (KR)

(72) Inventors: Hyeong-Soo Nam, Seoul (KR); Aleksandr Dolgov, Incheon (KR); Sang-Won Lee, Seoul (KR); Sogi Choi, Seoul (KR); Hong-Ki Yoo, Dajeon (KR); Hyung-Il Kim, Incheon (KR)

(73) Assignee: DOTTER INC., Incheon (KR)

( * ) Notice: Subject to any disclaimer, the term of this patent is extended or adjusted under 35 U.S.C. 154(b) by 244 days.

This patent is subject to a terminal disclaimer.

(21) Appl. No.: 18/603,550

(22) Filed: Mar. 13, 2024

(65) Prior Publication Data

US 2024/0221171 A1     Jul. 4, 2024

Related U.S. Application Data

(63) Continuation of application No. 17/695,477, filed on Mar. 15, 2022, now Pat. No. 11,972,574.

(30) Foreign Application Priority Data

Mar. 15, 2021     (KR) ........................ 10-2021-0033568
May 6, 2021     (KR) ........................ 10-2021-0058636

(51) Int. Cl.
*G06T 7/162*          (2017.01)
*G06F 18/211*          (2023.01)
(Continued)

(52) U.S. Cl.
CPC ............ *G06T 7/162* (2017.01); *G06F 18/211* (2023.01); *G06N 3/045* (2023.01); *G06N 3/0455* (2023.01);
(Continued)

(58) Field of Classification Search
CPC ......... G06T 3/4046; G06T 7/11; G06T 7/162; G06F 18/211; G06N 3/045; G06N 3/0455;
(Continued)

(56) References Cited

U.S. PATENT DOCUMENTS 10,402,689 B1     9/2019  Bogdanovych
10,474,713 B1     11/2019  Kim
(Continued)

FOREIGN PATENT DOCUMENTS

AU     2009305771 A1     4/2010
EP     2752172 B1     6/2016
WO     2011135103 A1     11/2011

OTHER PUBLICATIONS

Guo et al., "Lesion-Aware Segmentation Network for Atrophy and Detachment of Pathological Myopia on Fundus Images", 2020 IEEE 17th International Symposium on Biomedical Imaging (ISBI) Apr. 3-7, 2020, Iowa City, Iowa, USA, 4 pages.
(Continued)

*Primary Examiner* — Jennifer Mehmood
*Assistant Examiner* — Jose M Torres
(74) *Attorney, Agent, or Firm* — MH2 Technology Law Group, LLP

(57)          ABSTRACT

Disclosed is an image segmentation device. The image segmentation device may include: a storage unit storing a segmentation model learned so as to segment at least one predetermined object; and at least one processor inputting input data into the segmentation model and segmenting at
(Continued)

least one predetermined object in the input data, in which the segmentation model may include an encoder including at least one dimension reduction block reducing a dimension of the input data, a decoder including at least one dimension increase block increasing the dimension of output data output from the encoder by using data output from at least one dimension reduction block, and an auxiliary classification model receiving the output data and recognizing whether a specific object is included in the output data.

20 Claims, 10 Drawing Sheets

(51) Int. Cl.

| | |
|---|---|
| *G06N 3/045* | (2023.01) |
| *G06N 3/0455* | (2023.01) |
| *G06N 3/0464* | (2023.01) |
| *G06N 3/048* | (2023.01) |
| *G06N 3/082* | (2023.01) |
| *G06N 3/084* | (2023.01) |
| *G06N 3/09* | (2023.01) |
| *G06T 3/4046* | (2024.01) |
| *G06T 7/11* | (2017.01) |

(52) U.S. Cl.
CPC ........... *G06N 3/0464* (2023.01); *G06N 3/048* (2023.01); *G06N 3/082* (2013.01); *G06N 3/084* (2013.01); *G06N 3/09* (2023.01); *G06T 3/4046* (2013.01); *G06T 7/11* (2017.01); *G06V 2201/03* (2022.01)

(58) Field of Classification Search
CPC ...... G06N 3/0464; G06N 3/048; G06N 3/082; G06N 3/084; G06N 3/09; G06V 2201/03
See application file for complete search history.

(56) References Cited

U.S. PATENT DOCUMENTS

| | | | | |
|---|---|---|---|---|
| 11,026,749 | B1 | 6/2021 | Chatzizisis | |
| 2009/0222437 | A1 | 9/2009 | Niu | |
| 2011/0119213 | A1 | 5/2011 | Elisseeff | |
| 2016/0213253 | A1* | 7/2016 | Wang | A61B 5/14556 |
| 2020/0125823 | A1 | 4/2020 | Lo | |
| 2020/0222018 | A1* | 7/2020 | van Walsum | A61B 6/5264 |
| 2020/0226422 | A1 | 7/2020 | Li | |
| 2021/0378505 | A1 | 12/2021 | Sobol | |
| 2021/0406596 | A1 | 12/2021 | Hoffman | |
| 2022/0012890 | A1 | 1/2022 | Wu | |
| 2022/0061920 | A1 | 3/2022 | Long | |
| 2023/0140881 | A1* | 5/2023 | De Sisternes | A61B 3/102 382/130 |
| 2023/0267616 | A1* | 8/2023 | Cahyo | G06N 3/09 382/131 |

OTHER PUBLICATIONS

Bologna et al., "Automatic segmentation of optical coherence tomography pullbacks of coronary arteries treated with bioresorbable vascular scaffolds: Application to hemodynamics modeling", PLoS ONE, 2019, vol. 14, No. 3, e0213603, 17 pages.

Chen et al., "End to End Video Segmentation for Driving: Lane Detection for Autonomous Car", Deep Learning'18, 2018, State College, PA, USA, 7 pages.

Zhang et al., "Cervical image classification based on image segmentation preprocessing and a CapsNet network model", Int J Imaging System Technology, 2018, vol. 29, pp. 19-28.

Office Action dated Jul. 7, 2021 for corresponding Korean Application No. 10-2021-0058636, 13 pages (with English language translation).

Amendment dated Sep. 5, 2021 for corresponding Korean Application No. 10-2021-0058636, 11 pages (with English language translation).

Jiang et al. ("Retinal Vessels Segmentation Based on Dilated Multi-Scale Convolutional Neural Network," IEEE Access (vol. 7); Date of Publication: Jun. 13, 2019) (Year: 2019).

Feng et al. ("Patch-based fully convolutional neural network with skip connections for retinal blood vessel segmentation," IEEE International Conference on Image Processing; Date of Conference: Sep. 17-20, 2017) (Year: 2017).

Li et al. ("Residual U-Net for Retinal Vessel Segmentation," IEEE International Conference on Image Processing; Date of Conference: Sep. 22-25, 2019) (Year: 2019).

Rampat et al. ("A randomized trial comparing two stent sizing strategies in coronary bifurcation treatment with bioresorbable vascular scaffolds—The Absorb Bifurcation Coronary (ABC) trial," Cardiovascular Revascularization Medicine 20 (2019)) (Year: 2019).

Badrinarayanan et al. ("SegNet: A Deep Convolutional Encoder-Decoder Architecture for Image Segmentation," IEEE Transactions on Pattern Analysis and Machine Intelligence (vol. 39, Issue: 12, Dec. 1, 2017) (Year: 2017).

Lin et al. ("Multi-path refinement networks for high-resolution semantic segmentation," IEEE Conference on Computer Vision and Pattern Recognition, 2017) (Year: 2017).

Amer et al. ("ResDUnet: Residual Dilated UNet for Left Ventricle Segmentation from Echocardiographic Images," 42nd Annual International Conference of the IEEE Engineering in Medicine & Biology Society; Date of Conference: Jul. 20-24, 2020) (Year: 2020.

Tsantis et al. ("Automatic vessel lumen segmentation and stent strut detection in intravascular optical coherence tomography", Med Phys. 39(1), Jan. 2012) (Year: 2012).

Ughi et al. ("Automatic segmentation of in-vivo intra-coronary optical coherence tomography images to assess stent strut apposition and coverage," Int. J. Cardiovasc Imaging 28(2), Feb. 25, 2011) (Year: 2011).

Bailey, ("Theoretical Advantages and Disadvantages of Stent Strut Materials, Design, Thickness, and Surface Characteristics", Journal of Interventional Cardiology, 2009) (Year: 2009).

Paoletti et al. ("Computer-assisted quantitative analysis of new interventional treatment methods," Computing in Cardiology 2013; 40:1207-1210) (Year: 2013).

English Translation of PT 2752172 T. (Year: 2016).

* cited by examiner

410

410

(a)

(b)

STENT IMPLANTATION + NEWBORN INTERNAL MEMBRANE PROLIFERATION 2D MAP

BLOOD VESSEL 3D RECONFIGURATION

QUANTITATIVE MEASUREMENT AND COMPARISON OF NEWBORN INTERNAL MEMBRANE
PROLIFERATION WEEKLY AFTER IMPLANTING BIODEGRADABLE STENT

DEEP LEARNING BASED IMAGE SEGMENTATION METHOD INCLUDING BIODEGRADABLE STENT IN INTRAVASCULAR OPTICAL TOMOGRAPHY IMAGE

CROSS-REFERENCE TO RELATED APPLICATIONS

This application is a Continuation of U.S. patent application Ser. No. 17/695,477, filed 15 Mar. 2022, which claims priority to and the benefit of Korean Patent Application No. 10-2021-0033568 filed in the Korean Intellectual Property Office on Mar. 15, 2021, and Korean Patent Application No. 10-2021-0058636 filed in the Korean Intellectual Property Office on May 6, 2021 the entire contents of which are incorporated herein by reference.

TECHNICAL FIELD

The present disclosure relates to applying a semantic segmentation technique which is an image segmentation method using deep learning to an intravascular optical tomography image, and particularly, to a method for automatically segmenting a tissue area and a stent strut in a vascular image into a biodegradable stent is implanted.

BACKGROUND ART

For treatment of occlusive arteriosclerosis patients, it is possible to check an occluded portion and perform a stent implementation method by using an intravascular imaging technology. A conventional widely used metal-material stent as a bio extraneous material remains even after a procedure, and further, there is a disadvantage that a risk of thrombosis is high. Therefore, a bioresorbable stent which is slowly dissolved as time elapsed after the procedure is presented as an alternative to plane natural recovery of a vascular function. An excellent resolution of an intravascular optical coherence tomography (IV-OCT) image may enable imaging of a minute structure of a vascular inner wall and the stent. Conventionally, for a quantitative evaluation for a stent procedure after the procedure, a vascular tissue and the stent are manually extracted from the IV-OCT image to quantitatively determine a stent attachment degree and a proliferation degree of a newborn internal membrane after the procedure. However, this requires a lot of time, and may be a task in which a labor intensity is very high. In order to solve this, a method for accurately and automatically extracting the vascular tissue and the stent rapidly needs to be developed, and the evaluation after the stent procedure should be able to be performed automatically and quantitatively based thereon.

SUMMARY OF THE INVENTION

The present disclosure is contrived to correspond to the above-described background art, and has been made in an effort to provide biodegradable stent (BRS) segmentation software of an Aurios product.

However, technical objects of the present disclosure are not restricted to the technical object mentioned as above. Other unmentioned technical objects will be apparently appreciated by those skilled in the art by referencing to the following description.

An exemplary embodiment of the present disclosure provides an image segmentation device. The image segmentation device may include: a storage unit storing a segmentation model learned so as to segment at least one predetermined object; and at least one processor inputting input data into the segmentation model and segmenting at least one predetermined object in the input data, in which the segmentation model may include an encoder including at least one dimension reduction block reducing a dimension of the input data, a decoder including at least one dimension increase block increasing the dimension of output data output from the encoder by using data output from at least one dimension reduction block, and an auxiliary classification model receiving the output data and recognizing whether a specific object is included in the output data, at least one predetermined object may include at least one of a strut and tissue of a biodegradable stent, and the input data may be an intravascular optical coherence tomography (OCT) image.

The processor may optimize weight values included in the segmentation model so as to express each of at least one predetermined object included the learning images in a final feature value map of the decoder in link with optimizing weight values included the encoder and the auxiliary classification model so as to recognize whether the specific object is included in the learning images through the auxiliary classification model when training the segmentation model.

The learning images may include at least one patch acquired by randomly cropping an image labeled with each of at least one predetermined object.

The learning images may include a plurality of first learning images including a first biodegradable stent configured by a strut having a first thickness, and a plurality of second learning images including a second biodegradable stent configured by a strut having a second thickness different from the first thickness.

A final output end of the decoder may further include a boundary refine module adjusting a final feature map input into a final classification operation so that a boundary for area segmentation related to each of at least one predetermined object is refined.

The final classification operation may include an operation through at least one convolutional layer and a Softmax activation function.

The boundary refine module may have a residual block structure.

At least one dimension reduction block and at least one dimension increase block may include a multi-scale dilated residual block having a plurality of convolutional layers having different dilation rates arranged in parallel and including a residual connection.

The dimension reduction block disposed on a final layer among at least one dimension reduction block may include a dropout layer for preventing overfitting.

The processor may perform 3D rendering by using final data output by inputting the input data into the segmentation model, and the input data output.

Technical solving means which can be obtained in the present disclosure are not limited to the aforementioned solving means and other unmentioned solving means will be clearly understood by those skilled in the art from the following description.

The method for detecting the vascular tissue and the biodegradable stent strut in the IV-OCT image can be usefully used for prognosis observation after the biodegradable stent procedure. Further, this method can be used for 3D rendering the biodegradable stent implantation method result (including a stent location, a newborn internal membrane generation degree, etc.), and this method can be used for a clinical research of verifying validity and safety of the biodegradable stent based thereon, and this method can also be used for deriving a best biodegradable stent design based thereon.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

DETAILED DESCRIPTION

Figure 1:
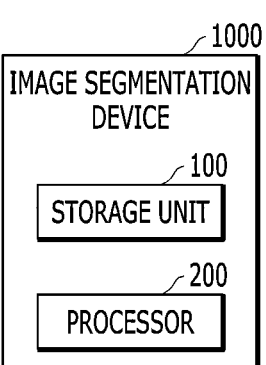
FIG. 1 is a block diagram for describing an example of an image segmentation device according to some exemplary embodiments of the present disclosure.

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an exemplary embodiment disclosed in the present disclosure, a detailed description of related known technologies will be omitted if it is determined that the detailed description makes the gist of the exemplary embodiment of the present disclosure unclear. Further, the accompanying drawings are only for easily understanding the exemplary embodiment disclosed in this specification and the technical spirit disclosed by this specification is not limited by the accompanying drawings.

Although the terms "first", "second", and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present invention pertains. Terms defined in commonly used dictionaries should not be interpreted in an idealized or excessive sense unless expressly and specifically defined.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

In addition, the word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

Further, the terms "information" and "data" used in the specification may also be often used to be exchanged with each other.

It should be understood that, when it is described that a component is "connected to" or "accesses" another component, the component may be directly connected to or access the other component or a third component may be present therebetween. In contrast, it should be understood that, when it is described that a component is "directly connected to" or "directly access" another component, no component is present between the component and another component.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

In the present disclosure, an image segmentation device may segment at least one predetermined object from input data by using a learned segmentation model. As an example, the image segmentation device may segment a strut of a biodegradable stent in an intravascular optical coherence tomography (OCT) image by using the learned segmentation model. Here, the strut may be a member which is disposed in a circumferential direction of stent and includes a plurality of cells.

Specifically, the biodegradable stent may be a medical device which is implanted into a body organ having a tubular structure, such as a blood vessel, a gullet, a biliary duct, etc., to make a flow of internal contents of the tubular structure be smooth. In addition, the biodegradable stent may be made of a material which is slowly dissolved in the body as time elapsed after the procedure. In this case, a conventional metallic stent is a material that reflects a light source to be remarkably displayed in the optical coherence tomography image. However, as the biodegradable stent is made of a material penetrated by the light source, it may be difficult for a user to identify the biodegradable stent.

More specifically, the light source in an intravascular optical coherence tomography image technology may have a bandwidth of 1240 nm to 1350 nm. Under such a light source, the metallic stent may be remarkably shown as a shade, etc., is expressed. On the contrary, the biodegradable stent may have a rectangular shape such as a brick while showing an intermediate shade of a contrast medium (intravascular) and a vascular wall. In addition, a height (a thickness of the strut) may have 80 to 160 microns and a length (a width of the strut) may have 100 to 300 microns. Further, the shade of the biodegradable stent may not be expressed unlike the metallic stent. In other words, it may be difficult for the user to definitely identify the strut of the biodegradable stent in the optical coherence tomography image. Accordingly, the image segmentation device in the present disclosure may segment the biodegradable stent in the intravascular optical coherence tomography image by using the segmentation model. Hereinafter, the image segmentation device according to the present disclosure will be described through FIGS. 1 to 7.

FIG. 1 is a block diagram for describing an example of an image segmentation device according to some exemplary embodiments of the present disclosure.

Referring to FIG. 1, an image segmentation device 1000 may include a storage unit 100 and a processor 200. However, components described above are not required in implementing the image segmentation device 1000 and the image segmentation device 1000 may thus have components more or less than components listed above.

The image segmentation device 1000 may include a personal computer (PC), a note book, a mobile terminal, a smart phone, a tablet PC, and the like possessed by a user and may include all types of terminals which are accessible to a wired/wireless network. However, although not limited thereto, the image segmentation device 1000 may be a predetermined type server such as a microprocessor, a mainframe computer, a digital processor, a hand-held device, or a device controller.

In the present disclosure, the image segmentation device 1000 may segment at least one predetermined object in input data by inputting the input data into the learned segmentation model. Here, the segmentation model may be a model including an encoder that decreases a dimension of the input data and a decoder that increases the dimension of output data output from the encoder. As an example, the segmentation model may have a structure in which a U-network in which the encoder and the decoder forms a symmetrical form is transformed. However, the segmentation model is not limited thereto. Hereinafter, the segmentation model according to the present disclosure will be described through FIGS. 2 and 3.

Meanwhile, at least one predetermined object may include at least one of the strut and tissue of the biodegradable stent. Here, the strut may be a member which is disposed in a circumferential direction of stent and includes a plurality of cells. In addition, the tissue may be skin tissue. However, the tissue is not limited thereto.

Meanwhile, the storage unit 100 may include a memory and/or a persistent storage medium. The memory may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the present disclosure, the storage unit 100 may store the segmentation model learned to segment at least one predetermined object. However, the storage unit 100 is not limited thereto.

Meanwhile, the processor 200 may generally process an overall operation of the image segmentation device 1000. The processor 200 processes a signal, data, information, and the like input or output through the components or drives the application program stored in the storage unit 100 to provide or process information or a function appropriate for the user.

Meanwhile, the processor 200 may be constituted by one or more cores and may include processors for data analysis and deep learning, which include a central processing unit (CPU), a general purpose graphics processing unit (GPGPU), a tensor processing unit (TPU), and the like of the image segmentation device. The processor 200 may read a computer program stored in the storage unit 100 to perform data processing for machine learning according to an exemplary embodiment of the present disclosure. According to an exemplary embodiment of the present disclosure, the processor 200 may perform a calculation for learning the neural network. The processor 200 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 200 may process learning of a network function. For example, both the CPU and the GPGPU may process the learning of the network function and data classification using the network function. Further, in an exemplary embodiment of the present disclosure, processors of a plurality of image segmentation devices may be used together to process the learning of the network function and the data classification using the network function. Further, the computer program executed in the image segmentation device according to an exemplary embodiment of the present disclosure may be a CPU, GPGPU, or TPU executable program.

In the present disclosure, the processor 200 may segment at least one predetermined object in the input data by inputting the input data into the segmentation model stored in the storage unit 100. However, the processor 200 is not limited thereto.

Meanwhile, throughout this specification, an operation model, the neural network, a network function, and the neural network may be used as an interchangeable meaning. That is, in the present disclosure, the operation model, the (artificial) neural network, the network function, and the neural network may be interchangeably used. Hereinafter, the operation model, the neural network, the network function, and the neural network will be integrated into the neural network, and described.

The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network (DNN) is used, latent structures of the data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The disclosure of the deep neural network described above is just an example and the present disclosure is not limited thereto.

The neural network may be learned in at least one scheme of supervised learning, unsupervised learning, semi supervised learning, or reinforcement learning. The learning of the neural network may be a process of applying knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). A learning rate may be applied differently according to the number of repetition times of the learning cycle of the neural network. For example, in an initial stage of the learning of the neural network, the neural network ensures a certain level of performance quickly by using a high learning rate, thereby increasing efficiency and a low learning rate is used in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Meanwhile, according to some exemplary embodiments of the present disclosure, the segmentation model may have a structure in which a U-network in which the encoder and the decoder forms a symmetrical form is transformed. Hereinafter, the segmentation model according to the present disclosure will be described through FIGS. 2 to 4.

Figure 2:
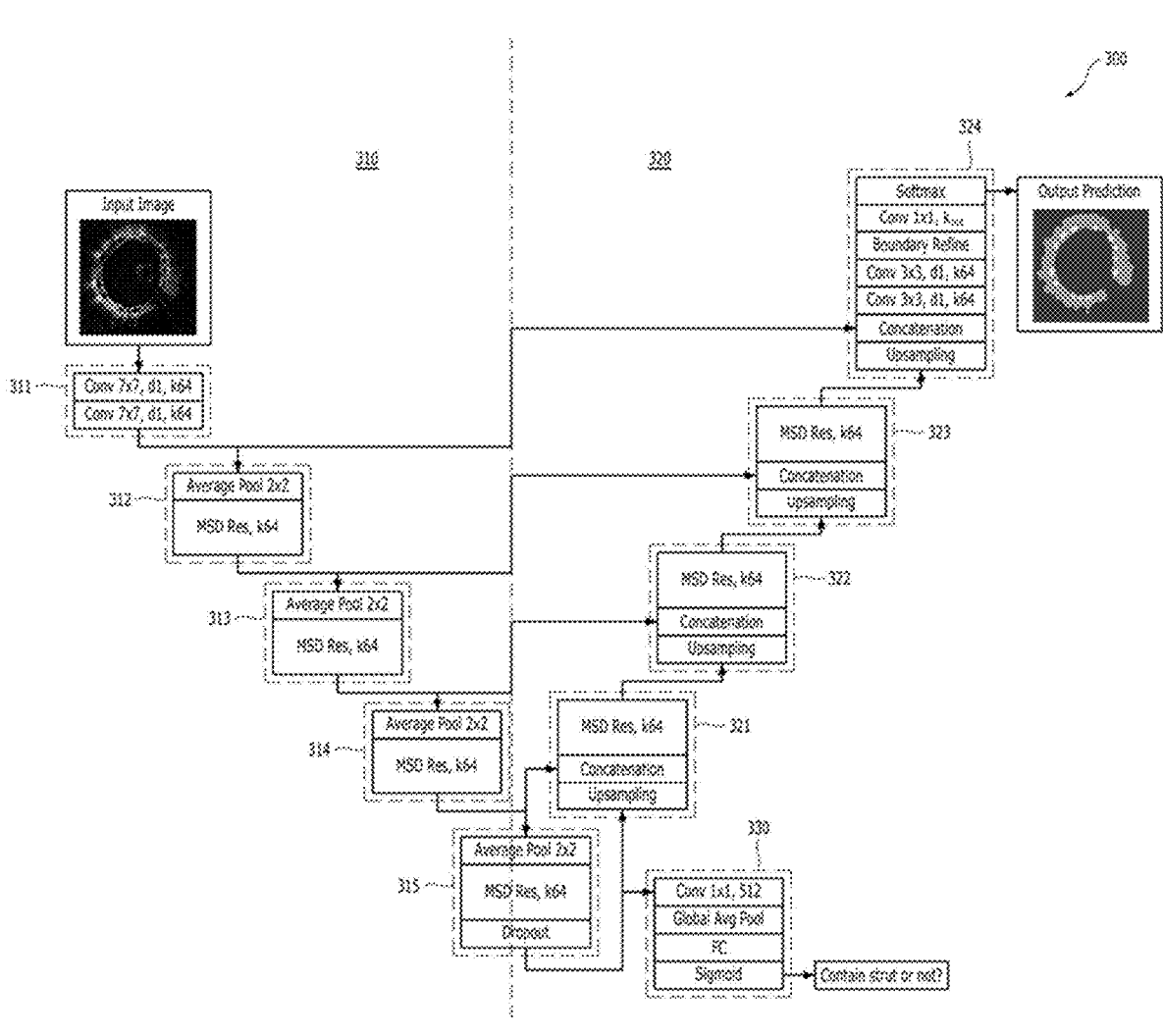
FIG. 2 is a diagram for describing an example of a segmentation model according to some exemplary embodiments of the present disclosure.
Figure 3:
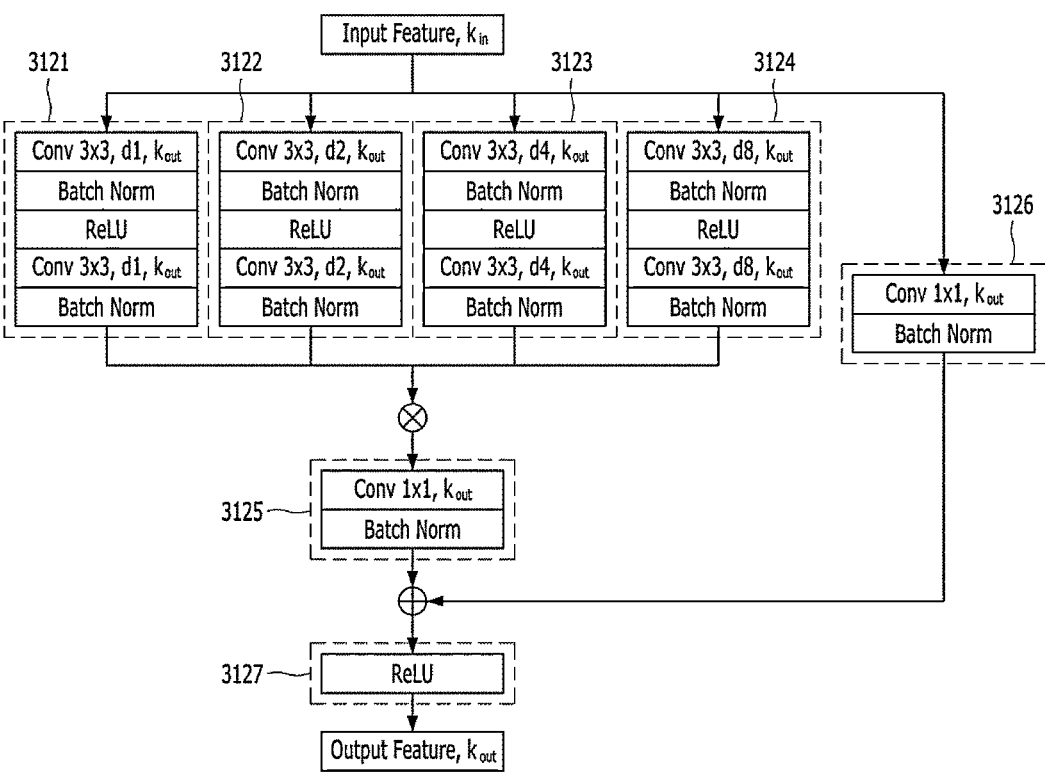
FIG. 3 is a diagram for describing an example of a multi-scale dilation residual block according to some exemplary embodiments of the present disclosure.
Figure 4:
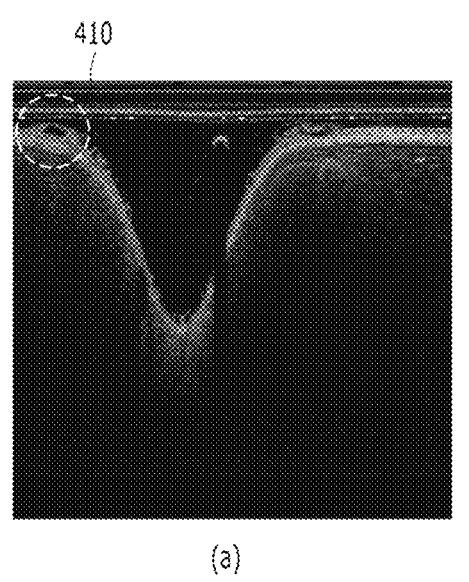
FIG. 4 is a diagram for describing an example of a learning image according to some exemplary embodiments of the present disclosure.
Figure 4:
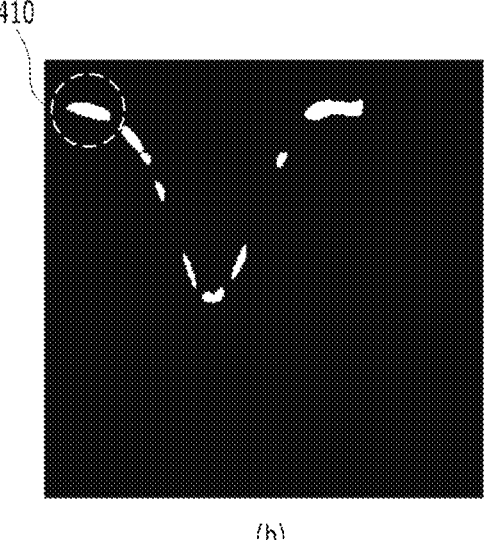

FIG. 2 is a diagram for describing an example of a segmentation model according to some exemplary embodiments of the present disclosure. FIG. 3 is a diagram for describing an example of a multi-scale dilation residual block according to some exemplary embodiments of the present disclosure. FIG. 4 is a diagram for describing an example of a learning image according to some exemplary embodiments of the present disclosure.

Referring to FIG. 2, the segmentation model 300 may include an encoder 310, a decoder 320, and an auxiliary classification model 330. However, the segmentation model 300 is not limited thereto.

The encoder 310 may include at least one dimension reduction block that reduces the dimension of the input data. However, the encoder 310 is not limited thereto.

As an example, a first dimension reduction block 311 into which the input data is initially input among at least one dimension reduction blocks may include at least one convolutional layer. In addition, the first dimension reduction block 311 may reduce the dimension of the input data through at least one convolutional layer.

More specifically, the first dimension reduction block 311 may represent and process the input data as a matrix having the dimension. For example, in a case where the input data is image data encoded in red-green-blue (RGB), the input data may be represented as a two-dimensional (for example, a two-dimensional image) matrix for each of R, G, and B colors. That is, a color value of each pixel of the input data may become a component of the matrix and a size of the matrix may be equal to the size of the image. Accordingly, the input data may be represented by three two-dimensional matrix (three-dimensional data array). In this case, the first dimension reduction block 311 multiplies the matrix components at respective positions of the convolutional filter and the image by each other while moving the convolutional filter through at least one convolutional layer to perform a convolutional process (input/output of a convolutional layer). The convolutional filter may be constituted by an n*n type matrix and may be generally configured as a fixed type filter smaller than the number of all pixels of the image. In other words, when m*m images are input to the convolutional layer (e.g., a convolutional layer in which the size of the convolutional filter is n*n), a matrix representing n*n pixels including each pixel of the image may be a component product with the convolutional filter (i.e., a product of respective components of the matrix). Components matched with the convolutional filter may be extracted from the image by the product with the convolutional filter. For example, a 3*3 convolutional filter for extracting a vertical straight line component from the image may be configured as [[0,1,0],[0,1,0],[0,1,0]] and when the convolutional filter is applied to an input image, the vertical straight line component matched with the convolutional filter may be extracted and output from the image. The convolutional layer may apply the convolutional filter to respective matrixes (i.e., R, G, and B colors in the case of R, G, and B coding images) for respective channels representing the image. The convolutional layer may extract a feature matched with the convolutional filter from the input image by applying the convolutional filter to the input image. A filter value (i.e., a value of each component of the matrix) of the convolutional filter may be updated by back propagation during a learning process of the segmentation model.

Meanwhile, in the present disclosure, numbers illustrated in at least one convolutional layer included in the first dimension reduction block 311, respectively may be exemplary examples of a size of a filter, a dilation rate, and a channel number, respectively.

For example, each of at least one convolutional layer included in the first dimension reduction block 311 may use a 7*7 convolutional filter. In addition, a dilation rate of each of at least one convolutional layer included in the first dimension reduction block 311 may be 1. Here, the dilation rate may mean an interval between kernels. In addition, k64 illustrated in each of at least one convolutional layer included in the first dimension reduction block 311 may be the number of exemplary channels. However, k64 is not limited thereto.

Meanwhile, a second dimension reduction block 312 into which data output from the first dimension reduction block 311 is input may include an average pooling layer and a multi-scale dilated residual block.

The average pooling layer may be a layer for reducing a memory usage and an operation amount by simplifying the data output from the first dimension reduction block 311. For example, when the output of the first dimension reduction block 311 is input to a pooling layer having a 2*2 average pooling filter, an average value included in each patch is output every 2*2 patches in each pixel of the image to compress the image. The aforementioned pooling may be a scheme that outputs a minimum value in the patch or outputs a maximum value of the patch and a predetermined pooling method may be included in the present disclosure.

Meanwhile, the multi-scale dilation residual block may be a block in which a plurality of convolutional layers having different dilation rates, a batch normalization layer, and a rectified linear unit (ReLU) layer are arranged in parallel.

For example, referring to FIG. 3, the multi-scale dilation residual block may include first to fifth residual blocks 3121, 3122, 3123, 3124, and 3125, a skip block 3126, and a ReLu layer 3127. However, the multi-scale dilation residual block is not limited thereto.

The respective first to fourth residual blocks 3121, 3122, 3123, and 3124 may perform a convolution for the input data. In this case, the respective first to fourth residual blocks 3121, 3122, 3123, and 3124 may have different dilation rates.

Specifically, the first residual block 3121 may include at least one convolutional layer in which the interval between the kernels is 1. In addition, the second residual block 3122 may include at least one convolutional layer in which the interval between the kernels is 2. In addition, the third residual block 3123 may include at least one convolutional layer in which the interval between the kernels is 4. Further, the fourth residual block 3124 may include at least one convolutional layer in which the interval between the kernels is 8. In this case, information on more various receiving areas may be used in one step (e.g., a step of reducing and outputting the dimension of the input data by the second dimension reduction block 312). However, the present disclosure is not limited thereto.

Meanwhile, further referring to the first residual block 3121, the first residual block 3121 may include at least one batch normalization layer and at least one rectified linear unit (ReLU) layer. In addition, the first residual block 3121 may perform an operation through a batch normalization activation function and a rectified linear activation function. Further, each of the second to fourth residual blocks 3122, 3123, and 3124 may include at least one batch normalization layer and at least one rectified linear unit. However, each of the second to fourth residual blocks 3122, 3123, and 3124 is not limited thereto.

Meanwhile, in the present disclosure, the respective first to fourth residual blocks 3121, 3122, 3123, and 3124 may be different in terms of the dilation rate, but may be the same in terms of the size of the filter and the number of channels. However, the respective first to fourth residual blocks 3121, 3122, 3123, and 3124 are not limited thereto.

Meanwhile, the fifth residual block 3125 may include a convolutional layer and a batch normalization layer having a 1*1 convolutional filter. When respective output data output from the first to fourth residual blocks 3121, 3122, 3123, and 3124 are input into the ReLU layer 3127, the number of parameters performed in the operation may be excessively large. Accordingly, the fifth residual block 3125 may reduce or optimize the number of parameters by using the convolutional layer and the batch normalization layer having the 1*1 convolutional filter. However, the fifth residual block 3125 is not limited thereto.

Meanwhile, the skip block 3126 may include the convolutional layer and the batch normalization layer having the 1*1 convolutional filter. In addition, the skip block 3126 may connect data acquired by performing 1*1 filtering and batch normalization for the input data input into the multi-scale dilation residual block to the data output from the fifth residual block 3125. In this case, in the learning process of the segmentation model, the multi-scale dilation residual block may perform learning based on a difference between the input data and the data output from the fifth residual block 3125. However, the multi-scale dilation residual block is not limited thereto.

Meanwhile, the ReLU layer 3127 is disposed at a final end of the multi-scale dilation residual block to serve to activate an output value to be non-linear. Specifically, since all values calculated in at least one convolutional layer are linear operations, an output of a non-linear function may be not learned only by the convolutional layer. Accordingly, the multi-scale dilation residual block may add non-linearity to the data output through the ReLU layer 3127. However, the multi-scale dilation residual block is not limited thereto.

Referring back to FIG. 2, at least one dimension reduction block may further include a third dimension reduction block 313 into which the data output from the second dimension reduction block 312 is input and a fourth dimension reduction block 314 into which the data output from the third dimension reduction block 313 is input. In addition, the third dimension reduction block 313 and the fourth dimension reduction block 314 may have the same structure as the second dimension reduction block 312. However, the third dimension reduction block 313 and the fourth dimension reduction block 314 are not limited thereto.

Meanwhile, a bottleneck block 315 disposed on a final layer of the encoder 310 among at least one dimension reduction block may have the same structure as the second dimension reduction block 312, but further include a dropout layer for preventing the overfitting. Here, the dropout layer may be a layer that may prevent the overfitting by omitting some of the nodes of the network in the process of the learning.

Meanwhile, according to some exemplary embodiments of the present disclosure, the dropout layer may be a 2 dimension (D) dropout layer for preventing the overfitting for 2D-structure input data. However, the dropout layer is not limited thereto.

Meanwhile, the decoder 320 may include at least one dimension increase block that increases the dimension of the output data output from the encoder 310 by using the data output from at least one dimension reduction block.

As an example, a first dimension increase block 321 into which the output data output from the encoder 310 is initially input among at least one dimension increase block may include an upsampling layer, a concatenation layer, and the multi-scale dilation residual block. In addition, the output data output from the encoder 310 among at least one dimension increase block may be input into the upsampling layer. In this case, the first dimension increase block 321 may increase the dimension of an output image output from the bottleneck block 315 through a pre-convolution or interpolation (bilinear) that performs upsampling, and then performs the convolution. In this case, positional information of the pixel may be lost in the process of increasing the dimension reduced in at least one dimension reduction block in the first dimension increase block 321. In order to prevent this, the concatenation layer may receive information (e.g., the positional information of the pixel, a high-level feature, etc.) for the dimension increase. As an example, the concatenation layer of the first dimension increase block 321 may receive the information for the dimension increase from the fourth dimension reduction block 314. As a result, the first dimension increase block 321 may reconstruct the positional information of the pixel which may be lost in the process of reducing the dimension of the data, and then increasing the dimension.

Meanwhile, at least one dimension increase block may include a second dimension increase block 322 into which the data output from the first dimension increase block 321 is input and a third dimension increase block 323 into which the data output from the second dimension increase block 322 is input. In addition, the second dimension increase block 322 and the third dimension increase block 323 may have the same structure as the first dimension increase block 321. However, the second dimension increase block 322 and the third dimension increase block 323 are not limited thereto.

Meanwhile, the concatenation layer of the second dimension increase block 322 may receive the information for the dimension increase from the third dimension reduction block 313. In addition, the concatenation layer of the third dimension increase block 323 may receive the information for the dimension increase from the second dimension reduction block 312. However, the concatenation layer of the third dimension increase block 323 is not limited thereto.

Meanwhile, a final output end 324 disposed on the final layer of the decoder 320 among at least one dimension increase block may include at least one of the upsampling layer, the concatenation layer, at least one convolutional layer, a boundary refine module, a deconvolutional layer, and a Softmax layer. However, the final output end 324 is not limited thereto.

Meanwhile, the final output end 324 may perform a final classification operation for area segmentation related to each of at least one predetermined object included in the input data. Here, the final classification operation may include an operation through at least one convolutional layer and a Softmax activation function. In this case, at least one convolutional layer for the final classification operation may be a layer using the 1*1 convolutional filter. Further, the Softmax activation function as a function which may be performed by the Softmax layer may be a function for segmenting at least one predetermined object. However, the Softmax activation function is not limited thereto.

Meanwhile, the concatenation layer of the final output end 324 may receive the information for the dimension increase from the first dimension reduction block 311.

Meanwhile, in the present disclosure, the boundary refine module may adjust a final feature map input into the final classification operation so that a boundary for the area segmentation related to each of at least one predetermined object is refined.

Specifically, the boundary refine module may be positioned between at least one convolutional layer having a 3*3 convolutional filter and at least one convolutional layer having the 1*1 convolutional filter. In addition, the boundary refine module may perform a final adjustment task of refining the boundary for at least one predetermined object before passing through the 1*1 convolutional layer in which the final classification operation for each pixel of the input data occurs. However, the boundary refine module is not limited thereto.

Meanwhile, according to some exemplary embodiments of the present disclosure, the boundary refine module may have a residual block structure.

Specifically, the boundary refine module may be a structure having a skip block including at least one convolutional layer and a ReLU layer. In this case, in the learning process of the segmentation model, the boundary refine module may perform the learning based on a difference between the input data and data output by performing boundary refinement. However, the boundary refine module is not limited thereto.

Meanwhile, the auxiliary classification model 330 receives the output data output from the encoder 310 to recognize whether a specific object is included in the output data. Here, the specific object may be the strut. However, the specific object is not limited thereto.

Meanwhile, the auxiliary classification model 330 may include the convolutional layer, a global average pooling layer, a fully connected layer, and a sigmoid layer. The global average pooling layer may be a layer for granting representativeness by extracting a single average value of the feature map for each channel for the input data. In addition, the fully connected layer is a layer in which all neurons in one layer and all neurons in a neighboring layer are connected. Further, the sigmoid layer may be a function for acquiring a non-linear value. The auxiliary classification model 330 may recognize whether the specific object is included in the input data in the learning process through the activation functions. However, the auxiliary classification model 330 is not limited thereto.

Meanwhile, according to some exemplary embodiments of the present disclosure, when the processor 200 of the image segmentation device 1000 trains the segmentation model 300, the processor 200 of the image segmentation device 1000 may optimize weight values included in the encoder 310 and the auxiliary classification model 330 so as to recognize whether the specific object is included in learning images through the auxiliary classification model 330. Here, the specific object may include at least one of the strut of the biodegradable stent and the tissue. In this case, the processor 200 may optimize weight values included in the segmentation model 300 so as to express each of at least one predetermined object included in the learning images in a final feature value map of the decoder 320 in link with optimizing weight values included in the encoder and the auxiliary classification model so as to recognize whether the specific object is included in the learning images through the auxiliary classification model when training the segmentation model.

Specifically, the processor 200 may optimize the weight values by backpropagation so as to minimize a loss function of each of at least one layer included in the segmentation model 300. Here, the loss function may be a function of digitizing a difference between a ground truth and a prediction.

Hereinafter, an example of a method for training the segmentation model 300 according to the present disclosure so as to optimize the loss function by the processor 200 of the image segmentation device 1000 will be described.

In the present disclosure, 30 intravascular-optical coherence tomography (IV-OCT) images (an image configured by an orthogonal coordinate system) is executed randomly from a learning image acquired in a total of 40 entities to secure 1200 data sets. In this case, the learning images may include a plurality of first learning images and a plurality of second learning images so that the image segmentation is achieved even for stents having various thicknesses.

The first learning images may be a plurality of images including a first biodegradable stent configured by a strut having a first thickness. As an example, data of 20 entities among a total of 40 entities may be a result of implanting a first stent having a strut thickness of 157 um.

Meanwhile, the second learning images may be a plurality of images including a second biodegradable stent configured by a strut having a second thickness different from the first thickness. As an example, data of 20 remaining entities among a total of a total of 40 entities may be a result of implanting a second stent having a strut thickness of 100 um. Through this, a data set is configured so that the image segmentation is also achieved for stents having various thicknesses. A manual segmentation result of the tissue area and the strut area is obtained in the data set, and a set of training (70%=28 entities), verification (10%=4 entities), and test (20%=8 entities) is configured as an entity unit.

Meanwhile, in the present disclosure, the learning of the segmentation model may be performed based on a random crop patch for a reason of a GPU memory limit and for prevention of the overfitting.

Specifically, the learning images acquired in a total of 40 entities may include at least one patch acquired by random crop of an image labeled with each of at least one predetermined object.

For example, referring to FIG. 4A, the learning image may include at least one predetermined object 410. In addition, referring to FIG. 4B, at least one predetermined object 410 included in the learning image may be labeled. However, at least one predetermined object 410 is not limited thereto.

Meanwhile, according to some exemplary embodiments of the present disclosure, the auxiliary classification model 330 may be learned so that it may be recognized whether the specific object is included in the random cropped patch.

Specifically, when the processor 200 of the image segmentation device 1000 trains the segmentation model 300, the processor 200 of the image segmentation device 1000 may optimize weight values included in the encoder 310 and the auxiliary classification model 330 so as to recognize whether the specific object is included in learning images through the auxiliary classification model 330. In addition, the processor 200 may optimize weight values included in the segmentation model 300 so as to express each of at least one predetermined object included in the learning images in a final feature value map of the decoder 320 in link therewith. As a result, the segmentation model 300 according to the present disclosure may be learned so that a feature value for strut segmentation of the encoder 310 and the decoder 320 is further optimized.

Meanwhile, a weight of at least one layer included in the segmentation model 300 may be backpropagated and optimized so as to minimize a loss function L. Here, the weight may be a kernel value of each of at least one convolutional layer, a scale in each of at least one batch normalization layer, or an offset in each of at least one batch normalization layer. However, the weight is not limited thereto.

Meanwhile, in the present disclosure, an adaptive moment estimation (ADAM) optimization algorithm is used and when a learning rate starts from $10^{-3}$ and there is no performance enhancement for 20 epoch, the learning is performed by reducing the learning rate by $\frac{1}{10}$. Further, when the learning rate reaches $10^{-9}$, the learning is terminated.

Meanwhile, in the present disclosure, the loss function L may be calculated by the following equation.

$$L = \lambda_1 L_{logloss} + \lambda_2 L_{L1} + \lambda_3 L_{aux} + \lambda_4 \|W\|_F^2 \qquad \text{[Equation 1]}$$

Here, $\lambda_i$ may be the weight. In addition, $L_{logloss}$ may be a weighted average cross entropy term acquired for three channels. In addition, $L_{L1}$ may be an L1 distance term for considering sparsity in segmenting the strut area. In addition, $L_{aux}$ may be a cross entropy term for a binary classification result of the auxiliary classification model 330. In addition, $$\|W\|_F^2$$

may mean a Frobenius norm of all weights of the segmentation model 300, and may be a term related to L2 normalization for preventing the overfitting of the learning. Each term may be weight aggregated by a weight $\lambda_i$ and configured as a total loss function for optimization.

Meanwhile, in the present disclosure, the weighted average cross entropy term $L_{logloss}$ may be calculated by the following equation.

$$L_{logloss} = -\sum_{x \in \Omega} w(x)g(x)\log(p(x)) \qquad \text{[Equation 2]}$$

Here, $g(x)$ may be the ground truth. In addition, $p(x)$ may be a probability product of the Softmax layer included in the final output end 324 disposed on the final layer of the decoder 320. In addition, $w(x)$ may be a weight for a vector x.

Meanwhile, in the present disclosure, $L_{L1}$ may be calculated by the following equation.

$$L_{L1} = |g(x) - p(x)| \qquad \text{[Equation 3]}$$

The weighted average cross entropy term $L_{logloss}$ is introduced in order to compensate a pixel number deviation of the tissue area, the biodegradable stent strut area, and the background area, and each is set to a ratio of 1:2:10. Meanwhile, a large weight term is set in order to take the strut area better, but adding a term representing an overlap degree of area like a dice coefficient still causes excessive segmentation of the strut area, and as a result, in the equation, the term is not considered. However, according to the exemplary embodiment, an example of adding the term representing the overlap degree of the area like the dice coefficient may be possible.

Meanwhile, performance evaluation of the learned segmentation model 300 is performed by calculating the dice coefficient for each of the tissue area and the strut area in order to determine a matching degree with the ground truth of the segmentation area. Hereinafter, a performance evaluation result of the learned segmentation model 300 according to the present disclosure will be described.

Figure 5:
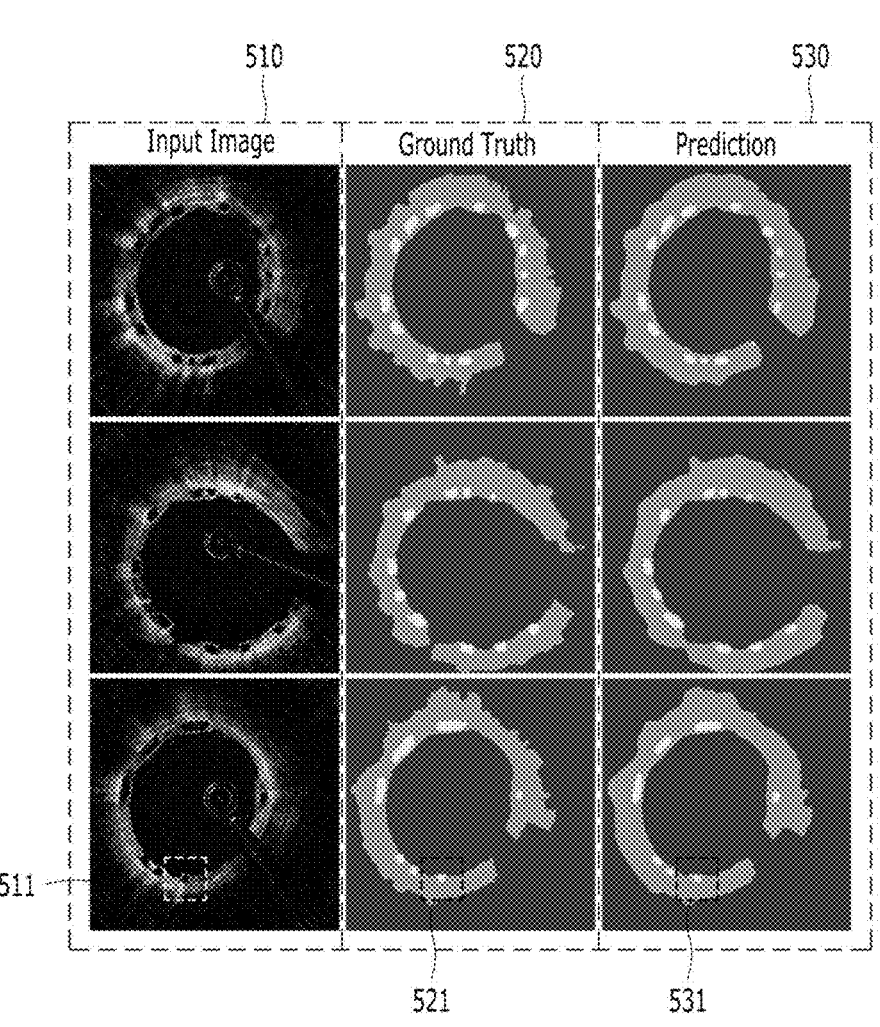
FIG. 5 is a diagram for describing a performance evaluation of a learned segmentation model according to some exemplary embodiments of the present disclosure.

FIG. 5 is a diagram for describing a performance evaluation of a learned segmentation model according to some exemplary embodiments of the present disclosure.

An input image of FIG. 5 may be input data 510 input into the segmentation model 300. In addition, the input data 510 may include at least one strut 511. The ground truth may be the ground truth 520. In addition, the ground truth 520 may represent at least one strut 521 corresponding to at least one strut 511 included in the input data 510. Further, the prediction may be the prediction 530. That is, the prediction 530 may be a result of performing the image segmentation for 520 to calculate precision (PR), recall (RC), and F-score. Each measurement value may be defined as in the following equation.

$$PR = \frac{TP}{TP + FP} \qquad \text{[Equation 5]}$$

$$RC = \frac{TP}{TP + FN}$$

$$F\text{-SCORE} = 2\frac{PR \times RC}{PR + RC}$$

Here, PR may be precision. In addition, RC may be recall. In addition, TP may be true positive. In addition, FP may be false positive. In addition, FN may be false negative.

A quantitative performance evaluation result for the image segmentation result may be represented as in Table 1 below.

TABLE 1

| | Tissue area Dice Coefficient | Strut area Dice Coefficient | Strut detection Precision | Strut detection Recall | Strut detection F-score |
|---|---|---|---|---|---|
| Segmentation model according to the present disclosure | 0.932 | 0.852 | 91.2% | 96.0% | 93.5% |
| Simple U-Net structure | 0.878 | 0.785 | 86.9% | 91.3% | 89.0% |
| Residual U-Net structure | 0.915 | 0.812 | 89.8% | 94.3% | 91.9% |
| Multi-scale Dilated U-Net structure | 0.918 | 0.835 | 90.2% | 95.0% | 92.5% |
| Addition of boundary refine module | 0.920 | 0.840 | 90.5% | 95.2% | 92.8% |
| Addition of auxiliary classification model | 0.925 | 0.842 | 90.6% | 95.6% | 93.0% |
| Newborn internal membrane proliferation degree   Low | — | 0.884 | 93.8% | 97.6% | 95.7% |
| Medium | — | 0.849 | 91.5% | 95.7% | 93.5% |
| High | — | 0.782 | 83.5% | 87.4% | 85.4% | the input data 510 by the segmentation model 300. In addition, the prediction 530 may be represented by segmenting at least one strut 531 corresponding to at least one strut 511 included in the input data 510. However, the prediction is not limited thereto.

In the present disclosure, in respect to the performance evaluation of the learned segmentation model 300, the dice coefficient may be calculated for each of the tissue area and the strut area in order to determine a matching degree with the ground truth 520 of the segmentation area. The dice coefficient may be calculated by the following equation.

$$dice_o = \frac{2\sum_{x \in \Omega} p_c(x) g_c(x)}{\sum_{x \in \Omega} p_c^2(x) \sum_{x \in \Omega} g_c^2(x)} \qquad \text{[Equation 4]}$$

Here, $p_c(x)$ may be an image having a predetermined size in which only a specific channel is selected in a probability product (prediction) image of the Softmax layer. In addition, $g_c(*)$ may be an image having a predetermined size in which only the specific channel is selected in the ground truth 520.

Further, in respect to strut detection performance, the number of false positives and the number of false negatives are determined through comparison with the ground truth Referring to Table 1, the precision for the strut detection may be represented as 91.2% as a result of performing the image segmentation by using the segmentation model 300 according to the present disclosure. In addition, the recall for the strut detection may be represented as 96%. Further, the F-score for the strut detection shows 93.5%. This may be a numerical value remarkably higher than a simple U-net structure, a residual U-Net structure, and a multi-scale dilated U-Net structure. Further, this may show a result higher than a result of just adding the boundary refine module to the multi-scale dilated U-Net structure or adding the auxiliary classification model 330 according to the present disclosure.

It may be verified that the dice coefficients for the tissue area and the strut area may be shown as 0.932 and 0.852, but shows a significantly high level matching degree with a manual result. Further, it may be verified that performance evaluation according to a thickness of a newborn internal membrane covering the strut is also performed, and even when newborn internal membrane proliferation is large, performance of approximately 85% or more is shown.

Meanwhile, according to some exemplary embodiments of the present disclosure, the image segmentation device 1000 may perform 3D rendering by using final data and input data output by using the segmentation model 300.

Hereinafter, an example of performing the 3D rendering by the processor 200 according to the present disclosure will be described through FIGS. 6 and 7.

Figure 6A:
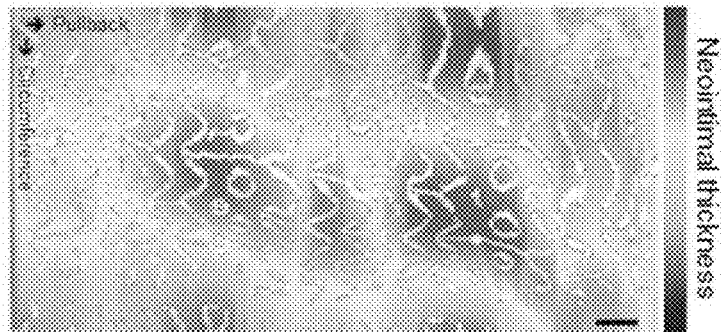
FIG. 6A-B are diagrams for describing examples of a 3D rendering result performed by an image segmentation device according to some exemplary embodiments of the present disclosure.
Figure 6B:
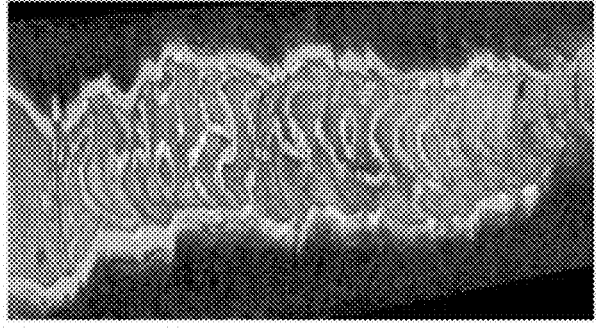
Figure 6C:
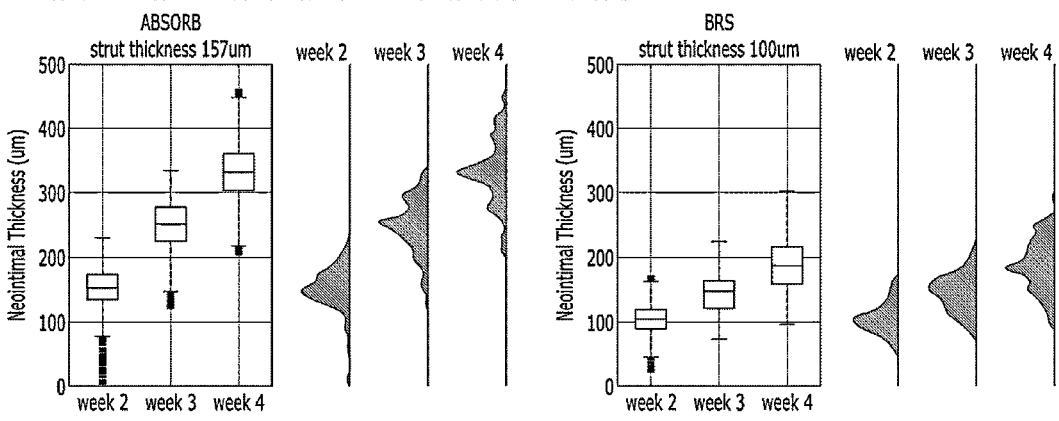
FIG. 6C provides graphs showing quantitative measurement and comparison of weekly newborn internal membrane proliferation after implanting a biodegradable stent.

FIGS. 6A-C are diagrams for describing examples of a 3D rendering result performed by an image segmentation device according to some exemplary embodiments of the present disclosure.

Meanwhile, according to some exemplary embodiments of the present disclosure, the processor 200 of the image segmentation device 1000 may generate a newborn internal membrane proliferation 2D map by using the final data and the input data output by using the segmentation model 300. As an example, FIG. 6A may illustrate a result of representing the stent and the proliferation degree of the newborn internal membrane as a 2D map when the stent is implanted.

Meanwhile, the processor 200 of the image segmentation device 1000 may perform the 3D rendering generated by using the final data and the input data output by inputting the input data into the segmentation model 300. As an example, FIG. 6B may illustrate a 3D screen of a blood vessel reconfigured by using the final data and the input data by the processor 200.

Meanwhile, referring to FIG. 6C, the processor 200 of the image segmentation device 1000 may also generate a graph so as to perform quantitative measurement and comparison for a degree for the newborn internal membrane proliferation weekly after implanting the biodegradable stent. However, the processor 200 of the image segmentation device 1000 is not limited thereto.

Figure 7:
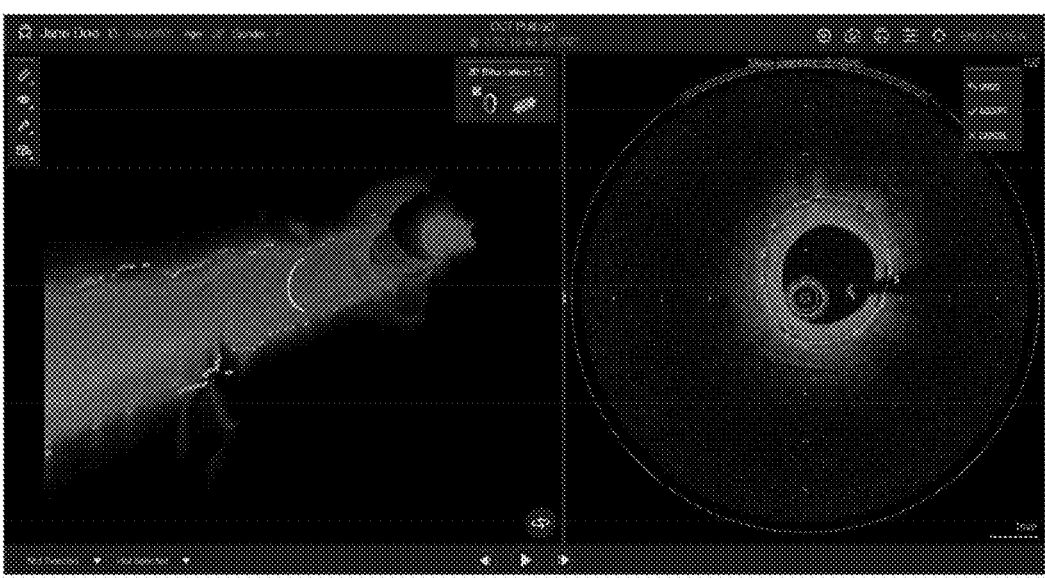
FIG. 7 is a diagram for describing another example of a 3D rendering result performed by an image segmentation device according to some exemplary embodiments of the present disclosure.

FIG. 7 is a diagram for describing another example of a 3D rendering result performed by an image segmentation device according to some exemplary embodiments of the present disclosure.

The processor 200 of the image segmentation device 1000 may perform the 3D rendering generated by using the final data and the input data output by inputting the input data into the segmentation model 300. In this case, the processor 200 may provide a 3D rendering result to the user through the display unit of the image segmentation device 1000.

As an example, FIG. 7 may illustrate a screen provided to the user after performing the 3D rendering for the blood vessel and the stent by using the final data and the input data by the processor 200.

Figure 8:
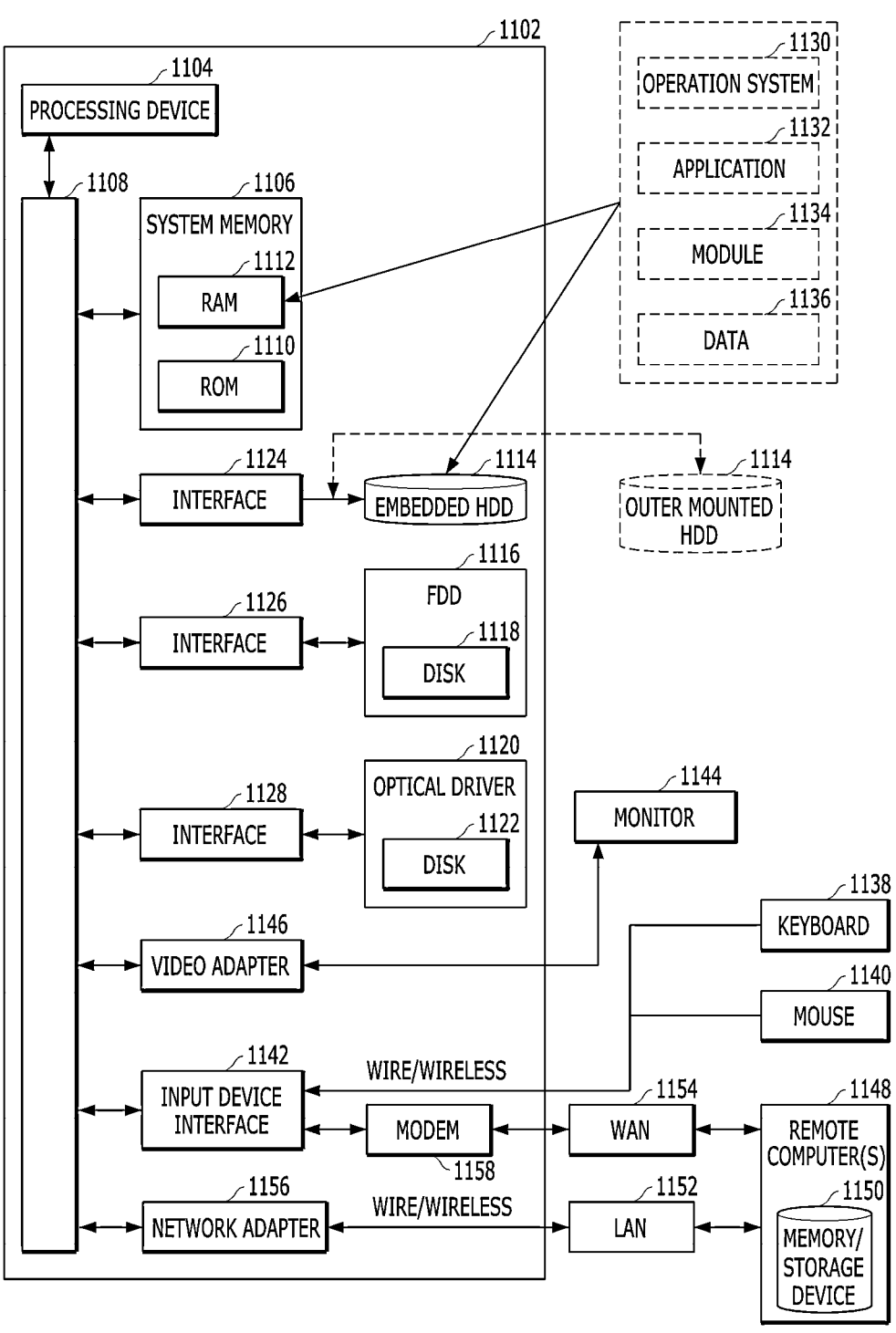
FIG. 8 is a general schematic view of an exemplary computing environment in which exemplary embodiments of the present disclosure may be implemented.

FIG. 8 is a general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. The computer includes, as a computer accessible medium, volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable instructions for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term "manufactured article" includes computer programs or media which are accessible by a predetermined computer-readable device. For example, a computer readable storage media includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" includes a wireless channel and various other media that can store, possess, and/or transfer instruction(s) and/or data, but is not limited thereto.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method of detecting at least one predetermined object in input data, the method comprising:

inputting the input data, using at least one processor, into a segmentation model of an image segmentation device that comprises the at least one processor and a non-transient, computer- readable storage unit storing the segmentation model trained using learning images so as to segment the at least one predetermined object, wherein the segmentation model includes an encoder including at least one dimension reduction block reducing a dimension of the input data, a decoder including at least one dimension increase block increasing the dimension of output data outputted from the encoder by using data outputted from at least one dimension reduction block, and an auxiliary classification model receiving the output data outputted from the encoder and recognizing whether a specific object is included in the output data to produce a binary classification result, wherein the at least one predetermined object includes at least one of a strut and tissue of a biodegradable stent, and wherein the input data is an intravascular optical coherence tomography (OCT) image, and wherein the at least one processor optimizes weight values included in the decoder of the segmentation model so as to express each of the at least one predetermined object included in the learning images in a final feature value map of the decoder and wherein the at least one processor optimizes weight values included in the encoder and the auxiliary classification model of the segmentation model so as to recognize whether the specific object is included in the learning images to produce the binary classification result through the auxiliary classification model so that a feature value for strut segmentation of the encoder and the decoder is further optimized when training the segmentation model, wherein further optimization of the encoder and the decoder comprises minimizing a loss function L that is calculated using a term for the binary classification result of the auxiliary classification model, and wherein the learning images include a plurality of first learning images including a first biodegradable stent configured by a strut having a first thickness, and a plurality of second learning images including a second biodegradable stent configured by a strut having a second thickness different from the first thickness; and, segmenting the at least one predetermined object in the input data, thereby detecting the at least one predetermined object in the input data.

2. The method of claim 1, wherein the learning images include at least one patch acquired by randomly cropping an image labeled with each of the at least one predetermined object.

3. The method of claim 1, wherein a final output end of the decoder further includes a boundary refine module adjusting a final feature map inputted into a final classification operation so that a boundary for area segmentation related to each of the at least one predetermined object is refined.

4. The method of claim 3, wherein the final classification operation includes an operation through at least one convolutional layer and a Softmax activation function.

5. The method of claim 3, wherein the boundary refine module has a residual block structure.

6. The method of claim 1, wherein the at least one dimension reduction block and the at least one dimension increase block include a multi-scale dilated residual block having a plurality of convolutional layers having different dilation rates arranged in parallel and including a residual connection.

7. The method of claim 1, wherein the at least one dimension reduction block includes a dropout layer for preventing overfitting.

8. The method of claim 7, wherein a final layer of the encoder includes the dropout layer.

9. The method of claim 7, wherein the dropout layer comprises a 2-dimension (D) dropout layer for preventing overfitting for 2D-structure input data.

10. The method of claim 1, wherein a bottleneck block is disposed on a final layer of the encoder.

11. The method of claim 1, wherein the at least one processor performs 3D rendering by using final data outputted by inputting the input data into the segmentation model, and the input data.

12. The method of claim 1, wherein the auxiliary classification model receives the output data output from a bottleneck block of the encoder.

13. The method of claim 1, wherein the at least one processor generates a graph so as to perform quantitative measurement and comparison for a degree of newborn membrane proliferation of implanted biodegradable stents.

14. The method of claim 1, wherein the specific object comprises a strut of a biodegradable stent.

15. The method of claim 1, wherein the specific object comprises a tissue.

16. The method of claim 1, wherein the learning images comprise at least one patch acquired by random crop of an image labeled with the at least one predetermined object.

17. The method of claim 16, wherein the auxiliary classification model is learned whether the specific object is included in a random cropped patch.

18. The method of claim 1, wherein the loss function L is calculated using a cross entropy term for the binary classification result of the auxiliary classification model.

19. The method of claim 1, wherein the loss function L is calculated using the following equation:

$$L = \lambda_1 L_{logloss} + \lambda_2 L_{L1} + \lambda_3 L_{aux} + \lambda_4 \|W\|_F^2$$

where $\lambda_i$ is the weight, $\lambda_{logloss}$ is a weighted average cross entropy term, $L_{L1}$ is an L1 distance term for considering sparsity in segmenting a strut area, $L_{aux}$ is a cross entropy term for the binary classification result of the auxiliary classification model, and $$\|W\|_F^2$$

is a Frobenius norm of all weights of the segmentation model.

20. The method of claim 1, further comprising implanting the biodegradable stent into a body organ having a tubular structure of a patient prior to inputting the input data.

*    *    *    *    *